(12) United States Patent
Yamashita et al.

(10) Patent No.: US 8,107,327 B2
(45) Date of Patent: Jan. 31, 2012

(54) INTERACTIVE PLAYLIST MEDIA DEVICE

(75) Inventors: Kosei Yamashita, Kanagawa (JP); Yasushi Miyajima, Kanagawa (JP); Makoto Inoue, Tokyo (JP); Takatoshi Nakamura, Kanagawa (JP); Masamichi Asukai, Kanagawa (JP); Masafumi Matsuda, Tokyo (JP); Toru Sasaki, Tokyo (JP); Mitsuru Takehara, Tokyo (JP); Toshiro Terauchi, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1365 days.

(21) Appl. No.: 11/385,084

(22) Filed: Mar. 21, 2006

(65) Prior Publication Data

US 2006/0227673 A1 Oct. 12, 2006

(30) Foreign Application Priority Data

Mar. 24, 2005 (JP) ................. 2005-085349

(51) Int. Cl.
*G11B 21/08* (2006.01)
*G06F 7/00* (2006.01)

(52) U.S. Cl. ............... 369/30.38; 369/30.01; 369/30.31; 700/213; 700/214; 700/245

(58) Field of Classification Search ............... 369/30.38, 369/30.01, 30.31; 700/213, 214, 245
See application file for complete search history.

(56) References Cited

U.S. PATENT DOCUMENTS

| | | | |
|---|---|---|---|
| 6,963,848 B1 | 11/2005 | Brinkerhoff | |
| 7,058,599 B2 | 6/2006 | Hanks et al. | |
| 2004/0057348 A1 | 3/2004 | Shteyn et al. | |
| 2004/0199525 A1 | 10/2004 | Matsuda et al. | |
| 2005/0021815 A1 | 1/2005 | Haneda et al. | |

FOREIGN PATENT DOCUMENTS

| | | |
|---|---|---|
| EP | 1 486 950 A1 | 12/2004 |
| EP | 1 087 398 B1 | 6/2007 |
| JP | 09171450 A | 6/1997 |
| JP | 10-171819 | 6/1998 |
| JP | 11-032070 | 2/1999 |
| JP | 2001-093226 A | 4/2001 |
| JP | 2002-116933 A | 4/2002 |
| JP | 2002-123264 A | 4/2002 |
| JP | 2002-123272 A | 4/2002 |
| JP | 2002-215174 A | 7/2002 |
| JP | 2002-344904 A | 11/2002 |
| JP | 2003-006375 A | 1/2003 |
| JP | 2003-018529 A | 1/2003 |
| JP | 2003-132662 A | 5/2003 |
| JP | 2003-150772 A | 5/2003 |
| JP | 2004-054023 A | 2/2004 |
| JP | 2004-334992 A | 11/2004 |
| JP | 2004-361868 A | 12/2004 |
| JP | 2005-037983 | 2/2005 |
| JP | 2005-135071 A | 5/2005 |

(Continued)

*Primary Examiner* — Joseph L Williams
(74) *Attorney, Agent, or Firm* — Wolf, Greenfield & Sacks, P.C.

(57) ABSTRACT

A player device uses playlists having names of contents. Users can update the playlists via network. The player device includes a storage device for storing digital data of the contents, a reception/reception circuit for downloading playlists, a display for displaying the titles of contents included in the playlists, a pointing device for specifying displayed titles, a circuit for retrieving digital data from the storage device in the event that digital data of a content specified by the pointing device is stored within the storage device, and an output circuit for outputting the retrieved digital data.

19 Claims, 4 Drawing Sheets

FOREIGN PATENT DOCUMENTS

| | | |
|---|---|---|
| JP | 2005-332087 A | 12/2005 |
| JP | 2006-004303 A | 1/2006 |
| JP | 2006-047644 A | 2/2006 |
| JP | 2006-201910 A | 8/2006 |
| WO | WO 00/17793 | 3/2000 |
| WO | WO 00/62223 | 10/2000 |
| WO | WO 02/19203 A2 | 3/2002 |
| WO | WO 03/038560 A2 | 5/2003 |
| WO | WO 2004/023487 A1 | 3/2004 |
| WO | WO 2005-019994 A2 | 3/2005 |
| WO | WO 2006-027973 | 3/2006 |

FIG. 4

| URL | http://www.server-A.com/drive/summer/dj-rec.xml |
|---|---|
| TITLE | RECOMMENDATIONS BY dj |
| RATING | ☆ ☆ ☆ |
| SCORE | 75 POINTS |
| NUMBER OF TUNES | 3 |
| TUNE 1: TITLE | SUMMER BEACH |
| TUNE 1: ARTIST | SINGER A |
| TUNE 2: TITLE | FIREWORKS |
| TUNE 2: ARTIST | ARTIST B |
| TUNE 3: TITLE | SUMMERTIME MEMORIES |
| TUNE 3: ARTIST | ARTIST C |
| NUMBER OF COMMENTS | 3 |
| COMMENT 1 | \<dj\><br>dj HERE. THIS ONE IS GREAT. GOTTA HAVE A SUNSET SCENE. |
| COMMENT 2 | \<penname_a\><br>> TRACK 3 IS JUST PERFECT. |
| COMMENT 3 | \<penname_b\><br>> I LIKE THAT ONE TOO. AND TRACK 2. |
| reserved | |

INTERACTIVE PLAYLIST MEDIA DEVICE

CROSS REFERENCES TO RELATED APPLICATIONS

The present invention contains subject matter related to Japanese Patent Application JP 2005-085349 filed in the Japanese Patent Office on Mar. 24, 2005, the entire contents of which are incorporated herein by reference.

BACKGROUND OF THE INVENTION

1. Field of the Invention

The present invention relates to a player device for tune data and the like.

2. Description of the Related Art

Tune player equipment having large-capacity storage devices, such as hard disk devices or non-volatile memory, are becoming mainstream. Such player equipment is capable of holding thousands or tens of thousands of tunes.

For example, a hard disk device with 100 GB capacity is capable of saving 3400 tunes or more if we say that the duration of each tune is three minutes. Further, MP3 encoding of the digital audio data compresses the data size down to $\frac{1}{10}$ to $\frac{1}{12}$ of the original data size, meaning that 40,000 tunes or more can be stored.

Accordingly, such tune player devices allows the user to always have tunes close at hand and even carried around, which can be listened to at will.

However, having so many tunes available in a single player device may cause difficulty for the user to find tunes matching his/her mood or preferences at that particular time.

One method that has been conceived to address this issue is sharing what is known as a playlist. A playlist is a list of tune titles which a user has selected according to his/her own preferences. For example, a user might collect the titles of tunes he/she likes to listen to during beachside drives, and make a list of these to create a "beachside drive" playlist.

Enabling this playlist to be exchanged and viewed among friends and the like can provide individuals with ideas on tunes to select. Accordingly, this method facilitates selection of tunes.

Another method is to form a community of individuals having like preferences and to exchange information. According to this method, members of this community can enjoy the benefits of the broad range of preferences expressed by other members.

Such methods are described in, for example, Japanese Unexamined Patent Application Publication No. 2004-13653 and Japanese Unexamined Patent Application Publication No. 2004 46575.

SUMMARY OF THE INVENTION

However, such playlist sharing methods merely enable playlists to be exchanged and browsed, meaning that one person is simply subjectively expressing his/her preferences and interests to others, without taking into consideration the preferences and situation of the individual to which the playlist has been introduced. This can lead to the following problems, for example.

Tunes introduced in the playlist often do not meet the preferences of the recipient.

The recipient cannot listen to the tunes unless recorded in the recipients own player equipment.

Any opinions regarding the contents of the playlist are made through other communication means such as e-mail, telephone calls, etc, so opinions cannot be readily exchanged. Further, such information cannot be shared among a great number of users.

The recipient cannot tell how widely the playlist received from another person is supported.

Moreover, the method of forming a community has the problem in that the exchanged information may not directly lead to a tune which an individual wants to listen to.

The present invention has been made in light of the above issues, and provides for facilitating selection of tunes matching the preferences of users, providing situations wherein users can exchange information regarding recommended tunes, and even enjoying communication one with another.

According a player device according to one embodiment of the present invention uses playlists having names of contents such that users can update the playlists via a network, and includes a storage device for storing digital data of the contents, a reception/reception circuit for downloading the playlists, a display for displaying the titles of contents included in the playlists, a pointing device for specifying one of the displayed titles, a circuit for retrieving digital data from the storage device in the event that digital data of a content specified by the pointing device is stored within the storage device, and an output circuit for outputting the retrieved digital data.

BRIEF DESCRIPTION OF THE DRAWINGS

FIG. 4 is a diagram for describing the items displayed in the embodiment.

DESCRIPTION OF THE PREFERRED EMBODIMENTS (1) Example of Overview of Player Device FIG. 1 illustrates an example of the external view a player device 10 in one embodiment of the present invention. In this example, the player device 10 has been configured as a portable device.

Figure 1:
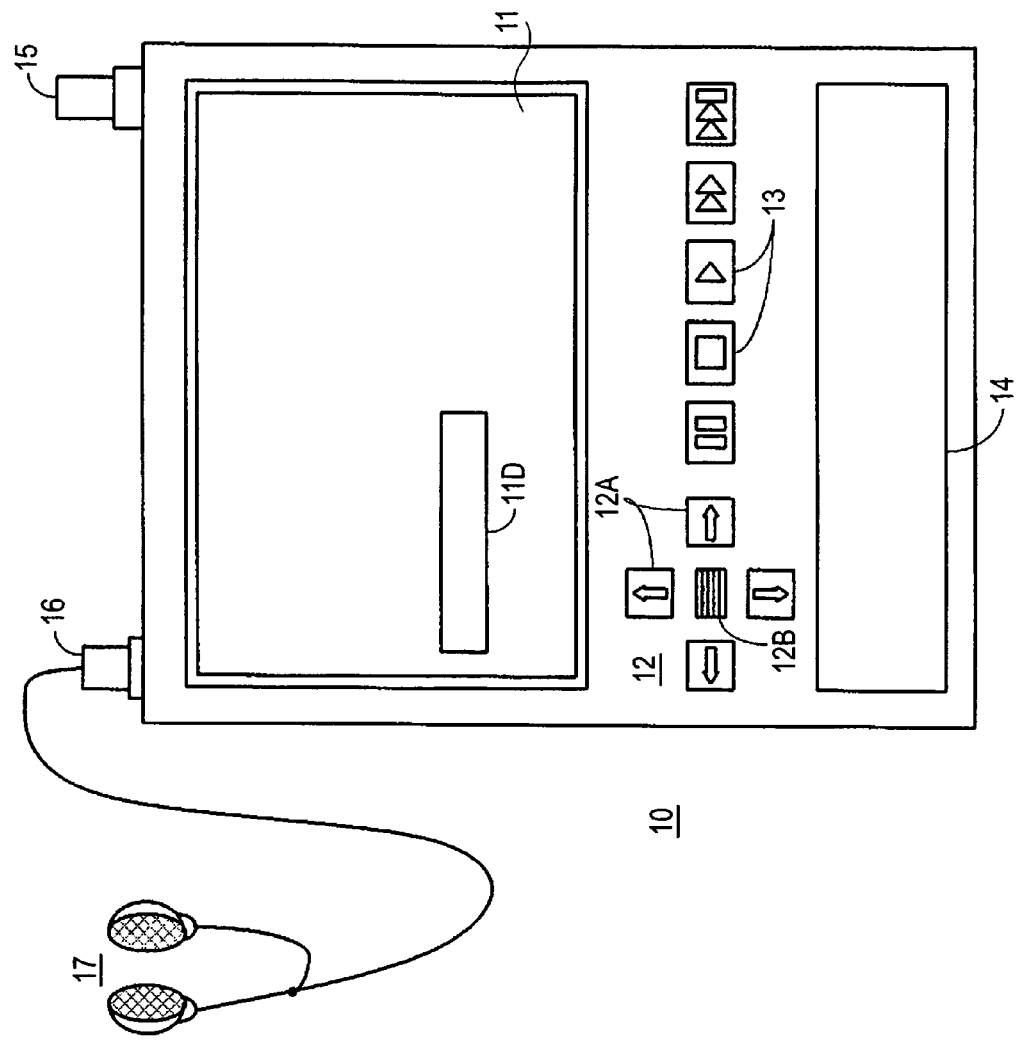
FIG. 1 is a frontal view illustrating the external view of an embodiment of the present invention.

It should be noted that in this Specification, the terms "tunes" and "music" cover a broad range of audio-expressed information including and beyond the general understanding of tunes and music, such as recital of poetry, literature, etc., performance of comedians and comic story-tellers, speeches, news, sport event coverage, and so forth.

The player device 10 has an overall rectangular flat form, and has on the lower portion thereof operating keys 12, mode keys 13, and typing keys 14. A display 11 is of a color LCD (liquid crystal display) panel for example, for color display of various types of text (including numbers and symbols; hereafter the phrase "text" should be interpreted according to this definition) by combining dots. As described later, at the time of selecting tunes, this display 11 displays playlists or the like, and at the time of playback of tunes, displays information relating to the tune.

Also, the operating keys 12 serve as a pointing device, and include cursor keys 12A for enabling moving of a cursor 11D vertically and horizontally on the display 11 whenever the cursor 11D is displayed thereupon, and an enter key 12B for selecting or instructing executing of an item indicated by the position of the cursor. Further, the mode keys 13 are for controlling playing, stopping, etc, of music. Further, typing keys 14 are for inputting text such as comments and the like.

Further provided to the upper portion of the player device 10 is an extensible antenna 15 and a headphone jack 16. The antenna 15 is for realizing wireless access to data on an external server, with a headphone 17 connectable to the jack 16.

Other arrangements encompassed by the present invention include using a pressable jog dial replacing the configuration of at least part of the keys 12A and the key 12B, and using a built-in antenna for the antenna 15.

(2) Example of Circuit Configuration of Player Device and Example of Operation

Figure 2:
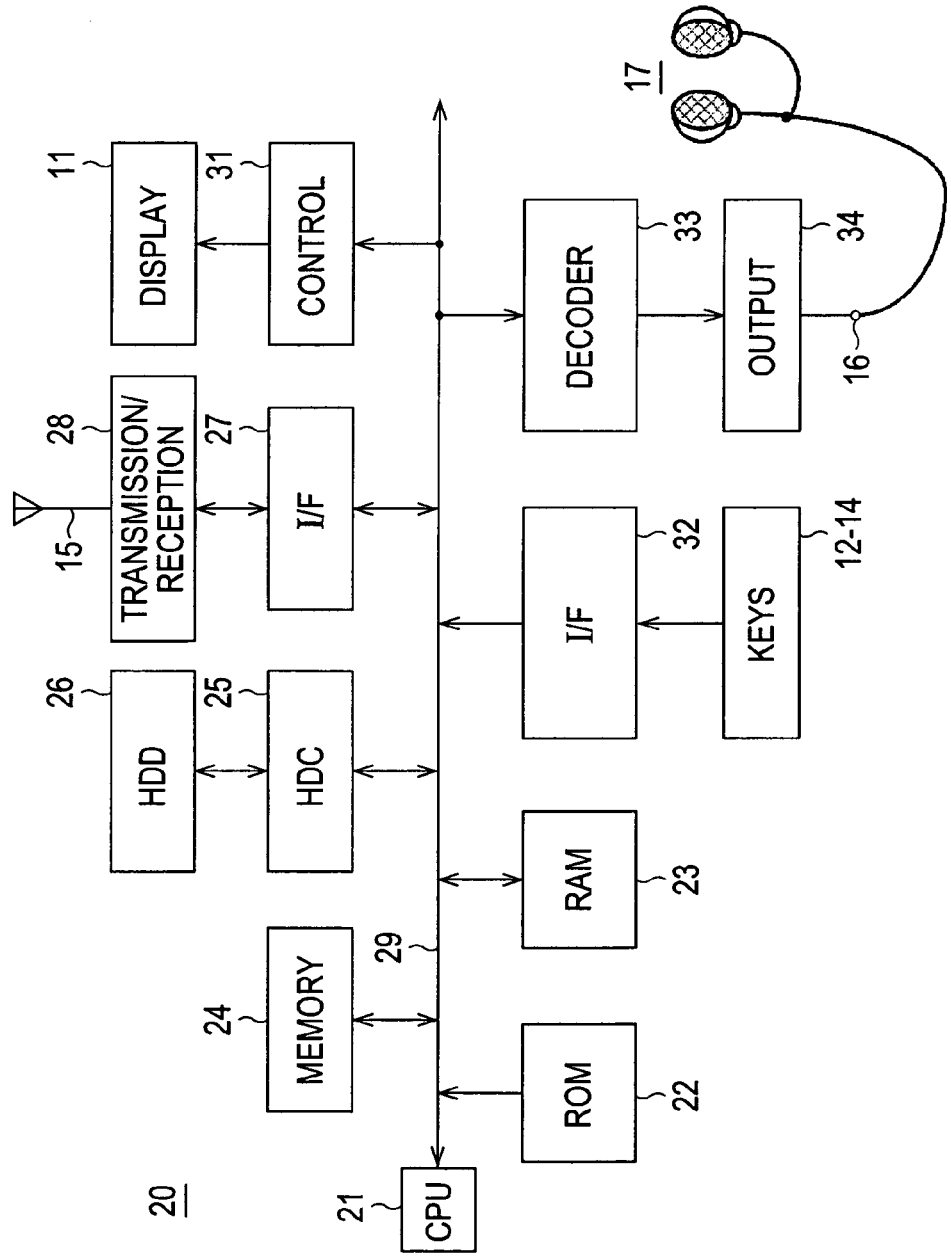
FIG. 2 is a systematic drawing illustrating the embodiment.

FIG. 2 illustrates an example of the circuit configuration of the player device 10. In this example, the player device 10 has built in a large-capacity storage device, so as to enable listening of the tunes stored therein, and also has functions of communication with an external server, so that tunes not stored in the built-in large-capacity storage device can be listened to as well.

In this example, the player device 10 has a general bus architecture, and also has a control circuit 20 configured of a microcomputer. More specifically, a CPU 21 is connected to a bus 29, and connected to this bus 29 are: a ROM 22, in which various types of programs are written; a RAM 23, serving as a work area; and a non-volatile memory 24, configured of, for example a flash memory.

Also, a hard disk device 26 is provided in this example as the large-capacity storage device for storing tune data, which is connected to the bus 29 via a hard disk controller 25. The tune data is saved in the hard disk device 26 in the from of audio data, and with the present embodiment, the tunes have been encoded and compressed with the MP3 format, for example. The hard disk controller 25 writes the digital audio data to the hard disk device 26 according to commands from the CPU 21.

Further provided is a transmission/reception circuit 28, connected to an interface circuit 27 via the bus 29. The transmission/reception circuit 28 wirelessly connects the player device 10 to an external server (or an access point thereof), to realize downloading of digital audio data of tunes, receiving streamed audio data of tunes, downloading of playlists, accessing electronic bulletins, and so forth. The antenna 15 is connected to the transmission/reception circuit 28. Note that the digital audio data of tunes provided on the server has been encoded and compressed by the MP3 format, for example.

Further, the display 11 is connected to the bus 29 via a display controller, and also the keys 12 through 14 are connected to the bus 29 via an interface circuit 32. The display controller 31 is for converting display data supplied from the CPU 21 into display signals and supplying the display signals to the display 11, whereby the display 11 can display text corresponding to the display data supplied from the CPU 21.

Also, a decoder circuit 33 is connected to the bus 29, and the decoder circuit 33 is connected to the jack 16 via an output circuit 34. The decoder circuit 33 is for receiving supply of MP3 format digital audio data, decoding the digital audio data into linear digital audio data, and supplying to the output circuit 34. Also, the output circuit 34 has a D/A converter and an output amplifier, so that digital audio data supplied to this output circuit 34 is subjected to D/A conversion into analog data and output to the jack 16.

With such a configuration, in the event of specifying playback of a tune stored in the hard disk device 26 as described later in (4), a specified tune is read out from the hard disk drive 26 by the hard disk controller 25. The digital audio data which has been read out is supplied from the hard disk controller 25 to the decoder circuit 33 via the CPU 21 and is decoded into the original linear audio data.

The decoded digital audio data is subjected to D/A conversion into analog audio signals at the output circuit 34, and is supplied to the headphones 17 through the jack 16. Accordingly, the tunes stored on the hard disk device 26 can be listened to with the headphones 17.

Also, in the event of instructing listening to a tune provided on an external server (including listening to samples) as described in (4), the digital audio data of the tune is read out from the server, and is wirelessly streamed.

The transmitted signals are received by the antenna 15 and supplied to the transmission/reception circuit 28, with the digital audio data of the specified tune being output from the transmission/reception circuit 28 and supplied to the decoder circuit 33 via the interface circuit 25 and CPU 21, so as to be decoded into the original linear digital audio data.

Accordingly, the decoded digital audio data is subjected to D/A conversion into analog audio signals at the output circuit 34 and is supplied to the headphones 17 through the jack 16, and accordingly can be listened to with the headphones 17.

Also, in the event that the user is permitted to download a tune provided on the server, the digital audio data of the tune is downloaded and saved in the hard disk device 26. Accordingly, the tune can thereafter be reproduced from the hard disk device 26 and be listened to.

(3) Display Example of Display 11

Figure 3:
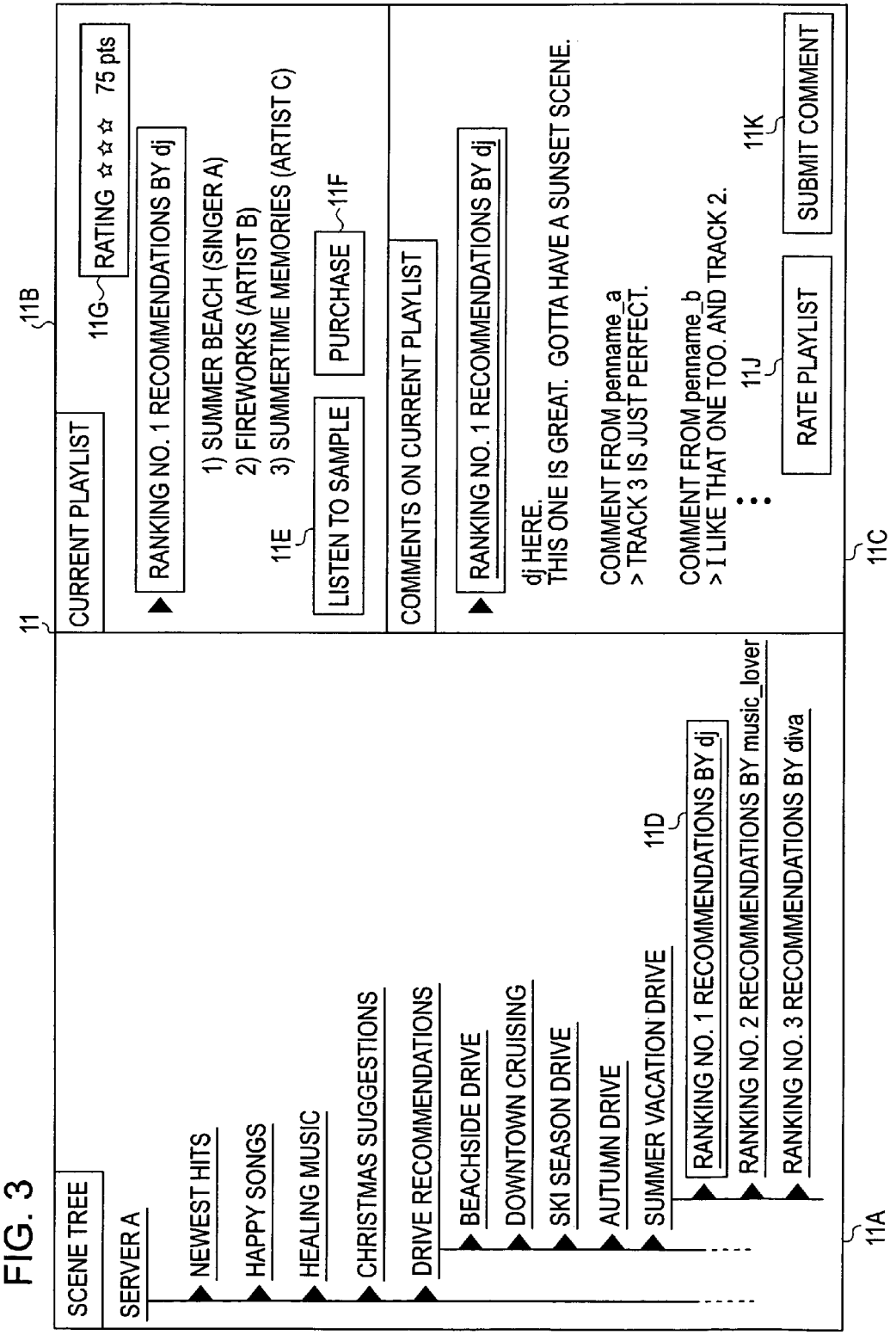
FIG. 3 illustrates an arrangement of display content according to the embodiment.

FIG. 3 illustrates an example of a display screen in the display 11 at the time of selecting a tune. The details of how the user operates this display screen will be described later in detail. The display screen shown in FIG. 3 is divided into a sub-screen 11A on the left half of the display 11, a sub-screen 11B on the upper half of the right side, and a sub-screen 11C on the lower half of the right side.

Accessing the server with the player device 10 downloads predetermined data from the server, and a "scene tree" is displayed on the sub-screen 11A. The idea behind this is that there are various situations states, and objects, in the conditions which dictate what sort of tune the user is going to want to listen to, and this is what is referred to as "scene". The scene tree is a visualized hierarchical arrangement of playlists provided in the server, displayed on the display 11 of the player device 10 in accordance with the data transmitted from the server. Accordingly, in the scene tree, the farther the hierarchical levels branch from the root, the more narrowly the hierarchical levels are classified. The playlists are shown at the lowest level.

FIG. 3 illustrates a state wherein a server A has been accessed and playlists provided at this server A is displayed in a scene tree format. The scenes are classified in a tree-like manner, and the playlists at the lowest level are displayed according to the name (including pen names, handles, etc.) of the compiler of the playlist. FIG. 3 illustrates a case of selecting, from the root toward the lowest layer, in the order of server A→drive recommendations→summer vacation drive→recommendations by dj.

This selection is made by executing an operation for pressing the cursor keys 12A (or turning the jog dial in the case of an arrangement using a jog dial) to move the cursor 11D through each hierarchical level and pressing the enter key 12B at a desired scene in that hierarchical level. Also, the playlists displayed at the lowest level are displayed in order of ranking. That is to say, as described later, the contents of the playlists are evaluated by a great number of other users, ranked in the server based on the results thereof, and displayed at the lowest level in order of ranking.

Upon placing the cursor 11D on the intended playlist and pressing the enter key 12B, the playlist where the cursor is situated is downloaded, and the contents of the "current playlist" are displayed on the sub-screen 11B. The playlist displayed as the "current playlist" is created by a certain user becoming the initiating compiler. Also, the initiating compiler has compiled the playlist using the player device 10 or a personal computer and uploaded it to the server.

Further, the titles (and performers) of the tunes contained in the playlist downloaded from the server are displayed as a list on the sub-screen 11B, as the contents of the playlist. At the time of displaying the playlist on the player device 10 of a user, the player device 10 distinguishes between tunes which are stored in the player device 10 and tunes which are not, and differentiates in the way the tunes are displayed in the list.

The situation shown in FIG. 3 is that wherein the playlist "recommendations by dj" originally compiled by "dj" has been selected, and the titles (and performers) of the tunes contained in this playlist are displayed. Buttons 11E and 11F labeled "listen to sample" and "purchase" are displayed to the left of the tune "Summertime Memories". These buttons are displayed due to corresponding tune data not being stored in the player device 10, meaning that the tune data corresponding to the two first tunes is stored in the player device 10, since these buttons 11E and 11F are not displayed.

The sub-screen 11B further displays a rating space 11G. This rating space 11G indicates evaluations made by general users regarding the playlist in the from of symbols and numbers.

Also, when the current playlist is downloaded from the server and displayed in the sub-screen 11B, the sub-screen 11C displays "comments on current playlist". These commands are downloaded from the server at the same time as the data in the sub-screen 11B and displayed in the sub-screen 11B, to convey commends on the tunes in the playlist selected in the sub-screen 11A.

More specifically, the commands are an arrangement of information posted on an electronic bulletin, meaning that a dedicated bulletin is run for this playlist. General users can post comments and ideas regarding the tunes and performers included in the playlists disclosed to the bulletin. The postings are added to those already posted. The commends posted are downloaded to the player device 10 and displayed in the sub-screen 11C as comments.

The sub-screen 11C shown in FIG. 3 displays a state wherein the playlist "recommendations by dj" has been selected from the scene tree and comments regarding the tunes and performers in the playlist have been displayed. Each of the comments are those that have been posted on the bulletin.

The sub-screen 11C further has displayed therein a "rate playlist" button 11J and "submit comment" button 11K. The "rate playlist" button 11J is for general users to operate when rating, and the results of the rating are reflected in the rating space 11G. Also, the submit comment button 11K us for general users to operate when adding a comment. Operating this button 11K enables writing comments to be posted on the bulletin.

(4) Example of Operations on the Display Screen
(4-1) Playing Tunes

The user moves the cursor 11D to one of the tunes displayed in the sub-screen 11B regarding which the buttons 11E and 11F are not displayed, and presses the enter key 12B. The tune data with that title is stored in the hard disk drive 26 in this case, so reading the digital audio data out from the hard disk device 26 and playing of the tune is executed as described above, and accordingly can be listened to though the headphones 17.

A tune thus selected from the hard disk drive can be played in the same was as with normal playback, with pausing a fast-forward operations using the mode keys 13 being enabled. Also, at this time, the tunes of the current playlist displayed on the sub-screen 11B that are stored in the hard disk device 26 can be selected or skipped using the mode keys 13.

Further, let us say that the user moves the cursor 11D to one of the tunes displayed in the sub-screen 11B regarding which the buttons 11E and 11F are displayed, the tune "Summertime Memories" in this case, and presses the enter key 12B. The tune of this title is not stored in the player device 10, so a request is transmitted to the server for distribution of digital audio data of the tune, and consequently, digital data corresponding to the tune "Summertime Memories" is streamed from the server, and the user can listen to the tune through the headphones. In this case, listening to a sample means an arrangement wherein the user is permitted to listen to a part of the tune, such as the first 30 seconds, or highlights of the tune, for example. Accordingly, the user can determine whether or not to purchase the tune.

In the event that user decides to purchase the tune, the user moves the cursor 11D to the purchase button 11F and presses the enter key 12B. Digital data of the tune with that title is downloaded from the server and stored on the hard disk device 26. User verification and payment procedures and the like necessary for purchasing the tune may be generally-implemented methods.

Accordingly, the next time the user selects the same playlist so as to be displayed in the state shown in FIG. 3, the listen to sample bulletin 11E and purchase button 11F are no longer displayed. Further, thereafter, selecting playback of the tune "Summertime Memories" plays the tune back from the hard disk device 26.

(4-2) Operations Regarding the Content of the Playlist

Upon the user operating the rate playlist button 11J from the sub-screen 11C in the state shown in FIG. 3, the results thereof are uploaded to the server and the rating of the playlist is updated in the server. The server calculates and discloses the points. Accordingly, the updated results of the server are returned to the player device 10, and the display of the rating space 11G is updated.

Also, pressing the submit comment button 11K brings up an unshown comment input space on the display 11 so that the user can input text using the typing keys 14. Also, the player device 10 is connected to a server running the electronic bulletin. The user inputs comments regarding a tune or performer in the playlist displayed before the comment input space was displayed, and finally operates a "send" button (post button), whereby the input comment is transmitted to the server and added to the playlist.

Once the playlist to which the comment has been added is returned to the player device 10, and display screen reverts to that shown in FIG. 3, but with the comment newly made being displayed in the updated sub-screen 11C.

Such an arrangement enables users to easily exchange live information with each other by adding comments. Also, the player device 10 and the server remain in a communicating state, meaning that the displayed playlist is always updated to the newest content.

(5) Example of Playlist

FIG. 4 illustrates an example of the contents of a playlist. The playlist is in XML (extensible Markup Language) format in actual practice, but is shown in a text table format here in FIG. 4 to facilitate description.

In FIG. 4, "URL" refers to the URL here the playlist is stored, and "Title" is the name given to this playlist, which is displayed at the lowest level in the scene tree in sub-screen 11A and is also the title used in sub-screens 11B and 11C. "Rating" and "rating points" are data shown in the rating space 11G in the sub-screen 11B, and "number of tunes" is to total number of tunes included in this playlist, which is equal to the number of tunes displayed in the sub-screen 11B.

Further, "tune i title" and "tune i artist" (i=1 through 3 in the case in FIG. 3) show the titles and performs of the tunes in the playlist, these being displayed in the sub-screen 11B in the from of a list. Also, "comment j" (j=1 through 3 in the case in FIG. 3) are comments displayed in the sub-screen 11C. When someone writes a comment to the playlist via the bulletin, the comments are added as Comment 4, Comment 5, Comment 6, and so on.

(6) Advantages of the Embodiment

With the player device 10 configured as described above, multiple situations for listening to tunes are provided in light of music listening styles of users, and playlists can be exchanged for each situation, so the probability that a user will be recommended a tune closer matching his/her preferences is increased.

Also, in the event that the player device 10 of the user does not have a recommended tune stored therein, the user can listen to a sample of the tune or purchase the tune. Comments regarding the playlist are disclosed, serving as further information for the user to select playlists. Also, comments regarding the playlist can be exchanged by way of electronic bulletin, thereby forming a community where live information is constantly circulated among individuals in a more human manner, so users are constantly in a situation where fresh tune recommendations are available.

Further, the playlists are ranked by participants, so there is a greater change of a user being recommended a tune which is closer to own preferences, as the rating is clearly indicated in points. Moreover, newest playlist information can be easily obtained.

Also, providing the playlists with themes facilitates exchange of tune information closer to the atmosphere of that theme. Further, points rating the playlist are automatically calculated by operating the player device 10 and the information thereof is automatically uploaded to the server, thereby automatically forming a popularity ranking of the playlist on the server. Moreover, users can learn new ways of enjoying and listening to music due to the above features.

(7) Modifications

In the event that the player device 10 of the user can access multiple servers A, B, C, and so forth, an arrangement may be made wherein the servers A, B, C, and so forth are displayed in the tree root, and upon the user selecting a target server, the playlists provided on that server are displayed as a scene tree.

The playlist data format may be text or binary, as long as the data is in an extensible format such as XML. Also, the above embodiment has been described with the locations where playlists are stored being indicated by URLs, but identifiers other than URLs may be used, as long as the storage destination can be uniquely defined on the network.

Also, the above embodiment has been described with the user explicitly rating the playlist displayed in the sub-screen 11B by operating the rate playlist button 11J, but arrangements may be made wherein the rating is lowered within the player device 10 whenever the user skips a tune, or raised when the user repeats a tune. Also, an arrangement wherein the rating points are automatically calculated in the player device 10 and uploaded to the server enables only popular tunes to be ranked high.

It should be further noted that while the above-described content is audio content such as tunes, the present invention can be applied in the same way to cases wherein the content is visual content, such as moving images, still images, and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. A player device configured to receive a playlist via a network, the playlist comprising titles of contents in the playlist, the player device comprising:
   a communication circuit configured to receive the playlist via the network;
   a display configured to display the titles of contents in the playlist;
   a selector configured to select a title from the playlist received by the communication circuit; and
   an output circuit configured to output a sample of content associated with the selected title, the sample of content being provided via the network.

2. The player device according to claim 1, wherein, in the event that the sample of content associated with the title selected by the selector is not stored on the player device, the sample of content is retrieved from a server on the network, and the retrieved sample of content is output by the output circuit.

3. The player device according to claim 1, wherein, in the event that the player device receives a plurality of playlists hierarchically arranged according to playback situations desired by users, the selector is configured to select a hierarchical level associated with one of the plurality of playlists.

4. The player device according to claim 1, wherein, in the event that the playlist comprises data indicating rating points of the playlist, the display is further configured to display the rating points, and the rating points are updated and uploaded to a server via the network.

5. The player device according to claim 1, wherein, in the event that the playlist comprises comments regarding the contents of the playlist, the display is further configured to display the comments, the communication circuit is further configured to upload other comments to a server via the network, and the other comments are added to the comments regarding the contents of the playlist.

6. The player device according to claim 1, wherein, in the event that the player device receives a plurality of playlists comprising data indicating rating points of the plurality of playlists, the rating points are automatically updated according to a playback state of the contents stored on the player device and uploaded to a server via the network.

7. The player device according to claim 2, wherein, in the event of retrieving the sample of content from the server on the network, experimental playback of the content to be reproduced from the sample of content is enabled, and the sample of content is saved by the player device in the event that a user wants to purchase full content associated with the sample of content.

8. The player device according to claim 1, wherein the sample of content associated with the selected title from the playlist includes full content of the selected title.

9. The player device according to claim 1, wherein the display is further configured to display ratings associated with each of a plurality of playlists received by the communication circuit, wherein the plurality of playlists are displayed in order of their respective associated rating.

10. The player device according to claim 1, wherein the display is further configured to display a number of contents included in the playlist received by the communication circuit.

11. The player device according to claim 1, wherein the display is further configured to display a network address of the playlist received by the communication circuit, wherein the network address indicates a location on the network where the playlist is stored.

12. A method of using a playlist received via a network, the method comprising:
    receiving, by a communication circuit, the playlist via the network, the playlist comprising titles of contents in the playlist;
    displaying the titles of contents in the playlist on a display;
    detecting a selection of a title from the playlist received by the communication circuit; and
    outputting a sample of content associated with the selected title, the sample of content being provided via the network.

13. The method of claim 12, wherein, in the event that the sample of content-associated with the selected title is not stored locally, the method further comprises:
    retrieving the sample of content from a server on the network.

14. The method of claim 12, wherein, in the event that the playlist comprises data indicating rating points of the playlist, the method further comprises:
    displaying the rating points on the display; and
    updating and uploading the rating points to a server via the network.

15. The method of claim 12, wherein, in the event that the playlist comprises comments regarding the contents of the playlist, the method further comprises:
    displaying the comments on the display;
    uploading other comments to a server via the network; and
    adding the other comments to the comments regarding the contents of the playlist.

16. The method of claim 13, further comprising:
    enabling experimental playback of the content to be reproduced from the sample of content; and
    storing the sample of content in the event that a user wants to purchase full content associated with the sample of content.

17. The method of claim 12, wherein the sample of content associated with the selected title from the playlist includes full content of the selected title.

18. The method of claim 12, further comprising:
    displaying ratings associated with each of a plurality of playlists received by the communication circuit, wherein the plurality of playlists are displayed in order of their respective associated rating.

19. The method of claim 12, further comprising:
    displaying a network address of the playlist received by the communication circuit, wherein the network address indicates a location on the network where the playlist is stored.

* * * * *